: US011944943B2

(12) United States Patent
Maru et al.

(10) Patent No.: US 11,944,943 B2
(45) Date of Patent: Apr. 2, 2024

(54) SMART ENTRAINMENT ATOMISATION MIXING SYSTEM

(71) Applicant: Oil & Gas Measurement Limited, Ely (GB)

(72) Inventors: Wessenu Abegaz Maru, London (GB); John Richard Waters, Newmarket (GB)

(73) Assignee: Oil & Gas Measurement Limited (GB)

( * ) Notice: Subject to any disclaimer, the term of this patent is extended or adjusted under 35 U.S.C. 154(b) by 0 days.

(21) Appl. No.: 17/853,149

(22) Filed: Jun. 29, 2022

(65) Prior Publication Data

US 2022/0331756 A1    Oct. 20, 2022

Related U.S. Application Data

(62) Division of application No. 15/939,568, filed on Mar. 29, 2018, now Pat. No. 11,406,948.

(30) Foreign Application Priority Data

Apr. 7, 2017    (GB) ..................... 1705617

(51) Int. Cl.
*B01F 25/00*    (2022.01)
*B01F 23/451*   (2022.01)
*B01F 25/313*   (2022.01)
*B01F 25/314*   (2022.01)
(Continued)

(52) U.S. Cl.
CPC ...... *B01F 25/31324* (2022.01); *B01F 23/451* (2022.01); *B01F 25/313311* (2022.01); *B01F 25/31334* (2022.01); *B01F 25/314* (2022.01); *B01F 25/31422* (2022.01); *B01F 35/2202* (2022.01); *B01F 2025/913* (2022.01); *B01F 2215/0409* (2013.01); *G01N 2001/2064* (2013.01)

(58) Field of Classification Search
CPC ................. B01F 25/31324; B01F 25/313311
See application file for complete search history.

(56) References Cited

U.S. PATENT DOCUMENTS 3,818,938 A    6/1974    Carson
4,285,601 A    8/1981    Miner
(Continued)

FOREIGN PATENT DOCUMENTS

| EP | 2145676 | 1/2010 |
|----|---------|--------|
| GB | 2164021 | 3/1986 |
| GB | 2357710 | 7/2001 |

*Primary Examiner* — Anshu Bhatia
(74) *Attorney, Agent, or Firm* — Mercedes V. O'Connor; Rockman Videbeck & O'Connor (57) ABSTRACT

A nozzle for injecting a first liquid mass into a stream of second liquid mass flowing within a pipe, comprising a first, outer, cylinder and second, inner, cylinder concentrically arranged about a nozzle axis, securing means for securing the nozzle to a wall of the pipe with the nozzle axis orthogonal to the pipe wall, the nozzle projecting into an interior of the pipe in use, duct means for receiving the first liquid mass and transporting it to the interior of the inner and outer cylinders, the inner cylinder comprising at least one hole arranged to expel liquid therethrough, and the outer cylinder comprising at least one hole arranged to expel liquid therethrough.

16 Claims, 4 Drawing Sheets

(51) Int. Cl.
*B01F 35/22* (2022.01)
*G01N 1/20* (2006.01)

(56) References Cited

U.S. PATENT DOCUMENTS

| | | | |
|---|---|---|---|
| 6,065,956 A * | 5/2000 | Cornil | B01F 35/718051 |
| | | | 431/90 |
| 6,659,636 B1 * | 12/2003 | Matula | B01F 25/434 |
| | | | 366/173.1 |
| 2007/0258315 A1 * | 11/2007 | Matula | B01J 4/008 |
| | | | 366/134 |
| 2017/0259219 A1 * | 9/2017 | Russell | B01F 25/313311 |

* cited by examiner

SMART ENTRAINMENT ATOMISATION MIXING SYSTEM

CROSS-REFERENCE TO RELATED APPLICATION(S)

This application claims priority to and is a divisional of U.S. Non-provisional application Ser. No. 15/939,568, filed Mar. 29, 2018, and claims priority to and is a divisional of UK Patent Application No. GB 1705617.7, filed Apr. 7, 2017, to the extent allowed by law and the contents of which are incorporated herein by reference in their entireties. U.S. Non-provisional application Ser. No. 15/939,568 is a national phase application under the Paris Convention based on UK Patent Application No. GB 1705617.7.

This invention relates to a nozzle, a liquid mixing system and a liquid mixing method.

Currently, both in oil & gas and other industries, there are various types of mixing systems in the market. Typically, blenders of the tumbler, convective and fluidisation types and agitators of the axial and radial impeller types are used to mix both miscible and immiscible fluids in many industries. For example, in the oil and gas industry, static mixers and jet mixers are very common to mix oil and water for automatic pipeline sampling for custody transfer applications. As a further example, in the food and pharmaceutical industries, high shear rotor-stator mixers are widely used for wet granulation and emulsification. The present invention is suitable for use in all industries where mixing is required, e.g. oil & gas, pharmaceutical, chemical, and food industries.

There are a number of problems with the current mixing technologies. For example, in conditions where the fluid has low density, low viscosity and low velocity, (these are generally the worst conditions for mixing) static mixers can mix relatively well at a relatively "low" Reynolds numbers (e.g. 4000-13000) but become worse at "very low" Reynolds numbers (e.g. <4000), where the flow of oil fields with end of production expectancy is typical. At a "relatively high" Reynolds numbers (e.g. 20000-120000), static mixers may suffer greatly with the associated significant pressure drop, which is highly undesirable. Therefore, the use of static mixers over a wide Reynolds number range is one of the great disadvantages. Much effort has been made to develop and also commercially exploit jet mixers by various companies.

A known jet mixing system is the Jiskoot Cojetix® system, which can be viewed at:
http://www.jiskoot.com/files/7314/2487/8365/
AD00697M_JISKOOT_Cojetix_Sampling_System_Borcure.pdf Here, a representative sample is extracted via a quill and through a pump. The pump injects fluid to the pipe creating jet mixing, while also passing substantial fluid through an isolation valve and to a sampler and receivers. However, this arrangement causes undesirable cyclic sampling as some of the fluid passing through the isolation valve will pass through the pump again and may be re-sampled.

Although these techniques prove to be relatively more efficient and have a better range compared to static mixers, they still suffer from at least four operational difficulties, which are also likely to introduce significant errors on the quantification of the water content.

i) There are various jet mixing designs and configurations and their performance is also very different with no well-established performance envelope. For example, some of the current best in class jet mixing systems resort to a vertical mixing configuration (where the orientation of the pipe in which mixing occurs runs parallel with gravity) at very low Reynolds numbers as they are unable to achieve sufficient mixing in horizontal configurations. Even this preferred vertical configuration is only suitable for relatively small pipe diameters—it requires a significant design change for big pipe diameters, for example, by creating unnecessary parallel streams and vertical bends that may require costly welding process, which results in significantly higher production and operational costs, unnecessary pressure drops as well as in an undesirable design and operational difficulties.

ii) Current jet mixing systems have a common problem in scaling up to relatively large pipe sizes as they are solely dependent on their jet penetration strength against the stream flow velocity.

iii) Current jet mixing systems utilise a quill to extract representative sample and re-inject it to the pipe in a "single-path" nozzle (or nozzles) via a pump to create jet mixing with the aim of extracting consistent and repeatable volume using cell samplers designed according to ISO 3171. One of the key limitations in this case is that the sample diverted via the isolation valve is repeatedly or cyclically sampled, making the whole sampling accuracy suspect.

iv) Current jet mixing systems utilise the penetration and break up mechanism of a round liquid column via single or multiple nozzles of, mostly, substantially similar size that may be injected at different angles. Although the jet break up mechanistic behaviour and the resulting maximum droplet size (and also Sauter mean droplet diameter—$D_{32}$ values) are determined by the values of the Weber and Froude numbers for round jets, the data used to determine these quantitative values is based on experimental work done using power mixers with rotor-stator mixing configuration, which has distinct convective behaviour compared to those that resulted from jet mixing. Therefore, the analysis employed for these systems is inherently erroneous.

It is an aim of the present invention to overcome these problems. To that end, a novel device and system configuration has been developed to mix two or more component liquids such as oil and water homogeneously but without creating emulsification. The system significantly exceeds the ISO 3171 standards, which set the minimum degree of mixing required so that a representative compositional sampling of water-in-oil can be performed with a better than 90% mixing homogeneity.

This is achieved by first understanding the intricate details of the mixing process via advanced fluid mechanics techniques and then designing and testing a novel device that delivers a truly homogeneous mixture efficiently at a wide operating envelope.

The present mixing system has advanced experimental instrumentation to characterise the mechanistic behaviour of homogeneous mixing that is enhanced by creating a horseshoe vortex and turbulent structures that will allow the tearing and stretching of the oil-liquid interfaces to create near mono-disperse droplet sizes, and entrain them to remain suspended for efficient and accurate representative sampling to take place.

SUMMARY OF THE INVENTION

In accordance with a first aspect of the present invention there is provided a nozzle for injecting a first liquid mass into a stream of second liquid mass flowing within a pipe, comprising:

a first, outer, cylinder and second, inner, cylinder concentrically arranged about a nozzle axis;

securing means for securing the nozzle to a wall of the pipe with the nozzle axis orthogonal to the pipe wall, the nozzle projecting into an interior of the pipe in use;

duct means for receiving the first liquid mass and transporting it to the interior of the inner and outer cylinders;

the inner cylinder comprising at least one hole arranged to expel liquid therethrough; and the outer cylinder comprising at least one hole arranged to expel liquid therethrough.

The outer cylinder could comprise at least one hole arranged to expel liquid therethrough at an angle to the nozzle axis. Said at least one hole in the outer cylinder could comprise a slit.

The outer cylinder could comprise at least one hole arranged to expel liquid therethrough in a direction upstream of the second liquid mass flowing within the pipe.

Said at least one hole in the inner cylinder could be arranged to expel liquid therethrough in a direction substantially perpendicular to the direction of flow of the second liquid mass flowing within the pipe.

In accordance with a second aspect of the present invention there is provided a mixing system comprising a nozzle as set out above.

In the mixing system above, the first liquid mass could be withdrawn from the second liquid mass flowing within the pipe at a position downstream of the nozzle. The mixing system could further comprise a pump operable to pump the first liquid mass to the duct means of the nozzle following its withdrawal from the second liquid mass flowing within the pipe. The mixing system could further comprise a sampling and analysis module intermediate the pump and duct means, wherein a portion of the first liquid mass passes through the sampling and analysis module when passing from the pump to the duct means.

The first liquid mass could be withdrawn from the second liquid mass flowing within the pipe using a scoop.

In accordance with a second aspect of the present invention there is provided a method of mixing a liquid flowing in a pipe comprising:

securing a nozzle to a wall of the pipe with the nozzle projecting into an interior of the pipe, said nozzle comprising:

a first, outer, cylinder and second, inner, cylinder concentrically arranged about a nozzle axis;

duct means for receiving a liquid mass and transporting it to the interior of the inner and outer cylinders;

the inner cylinder comprising at least one hole arranged to expel liquid therethrough; and the outer cylinder comprising at least one hole arranged to expel liquid therethrough;

connecting the duct means to a liquid withdrawal means downstream of the nozzle;

withdrawing a portion of the liquid mass using the liquid withdrawal means;

pumping the withdrawn liquid to the interior of the inner and outer cylinders; and expelling liquid through the holes in the inner and outer cylinders.

The steps of withdrawing a portion of the liquid mass using the liquid withdrawal means and pumping the withdrawn liquid to the interior of the inner cylinder could further comprise the step of:

pumping the withdrawn liquid through a sampling and analysis module operative to take measurements of the properties of the withdrawn liquid.

The step of pumping the withdrawn liquid to the interior of the inner and outer cylinders could be carried out by a variable speed pump controlled by a flow computer and controller in combination with a configuration and control system. The flow computer and controller could control the speed of the variable speed pump based on measurements taken by the sampling and analysis module.

The configuration and control system can be used with a flow computer and a programmable logic controller, or it can operate on its own using information from the sampling and analysis module and the flow meter. In this case, there is no need to include the programmable logic controller.

The invention will now be described with reference to the accompanying drawings, in which.

Figure 1:
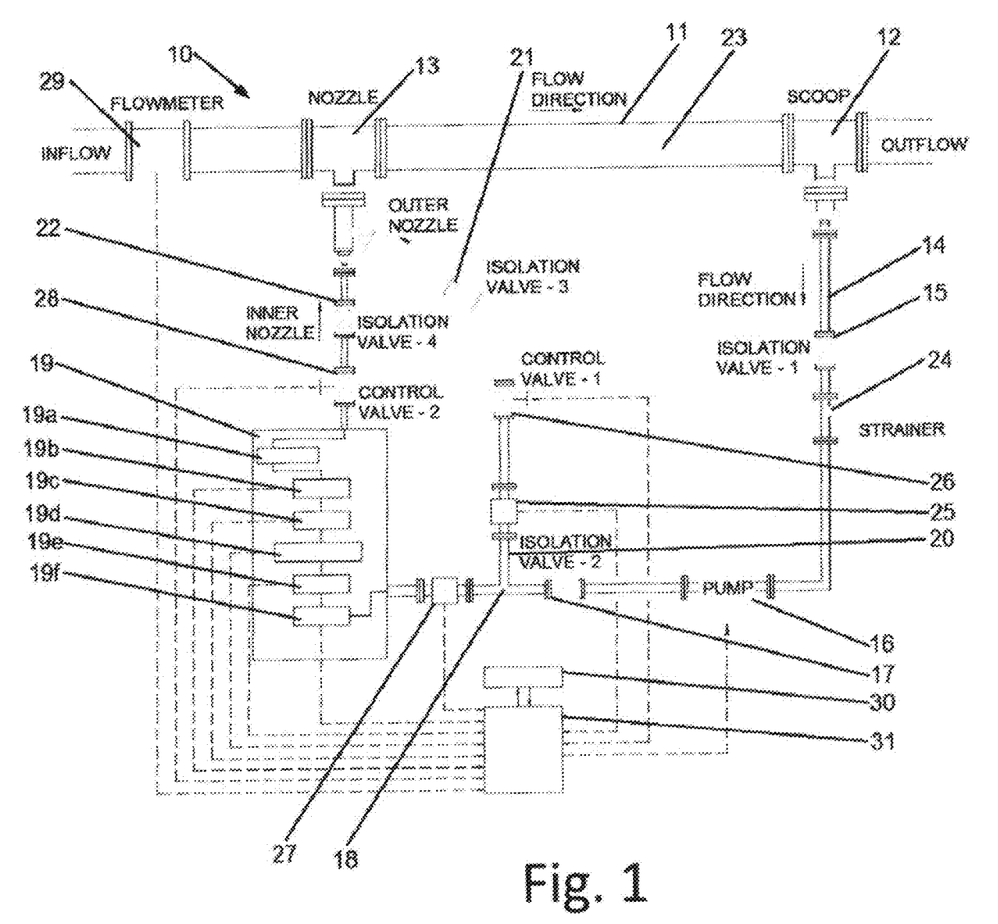
FIG. 1 schematically shows a mixing system in accordance with an embodiment of the present invention.

A first embodiment of the invention is schematically shown in FIG. 1.

FIG. 1 schematically shows a configuration of the present mixing system.

The mixing system 10 comprises a pipe 11 having an inflow (inlet) and an outflow (outlet). The direction of fluid flow in the pipe 11 is from left to right as pictured in FIG. 1 (see arrow marked FLOW DIRECTION).

The mixing system 10 comprises a scoop assembly 12, a nozzle assembly 13, a nozzle-scoop spool (or "mixing spool") 23 and a mixing, sampling, analysis and control flowpath 14. The scoop 12 extracts fluid passing through the pipe 11 and directs it into the mixing, sampling, analysis and control flowpath 14. The extracted fluid passes through an isolation valve 15, a strainer 24, a pump 16 and a further isolation valve 17 before reaching a junction 18.

At the junction 18 a portion of the extracted fluid continues to a sampling and analysis module 19 via flow meter 27, and a portion of the extracted fluid is diverted down a branch line 20, through a flow meter 25 and an isolation valve 21 and towards an outer nozzle, which will be described in more detail below.

The extracted fluid reaching the sampling and analysis module 19 undergoes chemical and physical tests as known in the art to determine the chemical and physical properties of the fluid. In the embodiment shown in FIG. 1, the density of the mixture is determined using a densitometer 19f, the viscosity using viscometer 19e, mixture temperature and line pressure using temperature and pressure transmitters 19d, the water cut using the water cut meter 19c, the salinity of water using salinity probe 19b while a physical sample of fixed grab or volume is withdrawn using cell sampler and deposited in to a receiver using the sampling module 19a for chemical analysis, for example Karl-Fischer titration.

The sampling and analysis module 19 is connected to a flow computer and controller 31. The flow computer can be any suitable processor, and the controller can be a programmable logic controller (PLC). The flow computer and controller 31 is in turn controlled by an advanced algorithm of the SmartMix® configuration and control system 30 in communication with the pump 16, flow meters 25 and 27 and control valves 26 and 28.

In an alternative arrangement, the configuration and control system (CCS) 30 may be used on its own in communication with flow meter 29 and sampling and analysis module 19, pump 16, flow meters 25 and 27 and control valves 26 and 28. In this arrangement there is no need for the flow computer and PLC. The CCS 30 may operate using model predictive control, or using a Bayesian machine learning algorithm.

In all cases, the measured properties can be used to actively vary the pump speed to optimize the amount of mixing performed by the nozzle 13 in the mixing spool 23.

The extracted fluid reaching the sampling and analysis module 19 then continues on through a control valve 28 and an isolation valve 22 and towards an inner nozzle, which will be described in more detail below.

In operation, the SmartMix® system gets initial information about the dynamics of the flow via flow meter 29 (this information may also be available from the control system of the client or operator of the pipeline). At this stage, the SmartMix® generally lacks the actual values of the thermophysical properties (density, temperature and composition) of the fluid in the pipeline, although it may be possible to input a baseline or estimated data based on information from a client or operator of the pipeline.

Prior art mixing systems use a constant speed pump power. Instead, the SmartMix® system uses a variable speed drive (VSD) pump, so that the energy utilised for jet mixing is utilised more efficiently. Pump 16 withdraws a suitable portion of the flow, based on the signal received from flow meter 29, via scoop 12 and passes it through flow meters 25 and 27. At this initial stage, pump 16 will run at its maximum and the flow through flow meters 25 and 27, or control valves 26 and 28, will show a 50:50 split. Very rapidly, based on the readings from the sampling and analysis module 19 (particularly from densitometer 19f, viscometer 19e, temperature and pressure transmitters 19d, water cut meter 19c and salinity probe 19b), a characterisation is established based on the advanced algorithm of the SmartMix® configuration and control system 30. This forms a model predictive control (MPC) and allows the pump to adjust so that mixing is carried out more efficiently, effectively and accurately. This process is called mixing on demand, and differs from prior art systems in which the pump is simply run at its maximum rating. It could also use a more advanced control system with machine learning capability.

Figure 2:
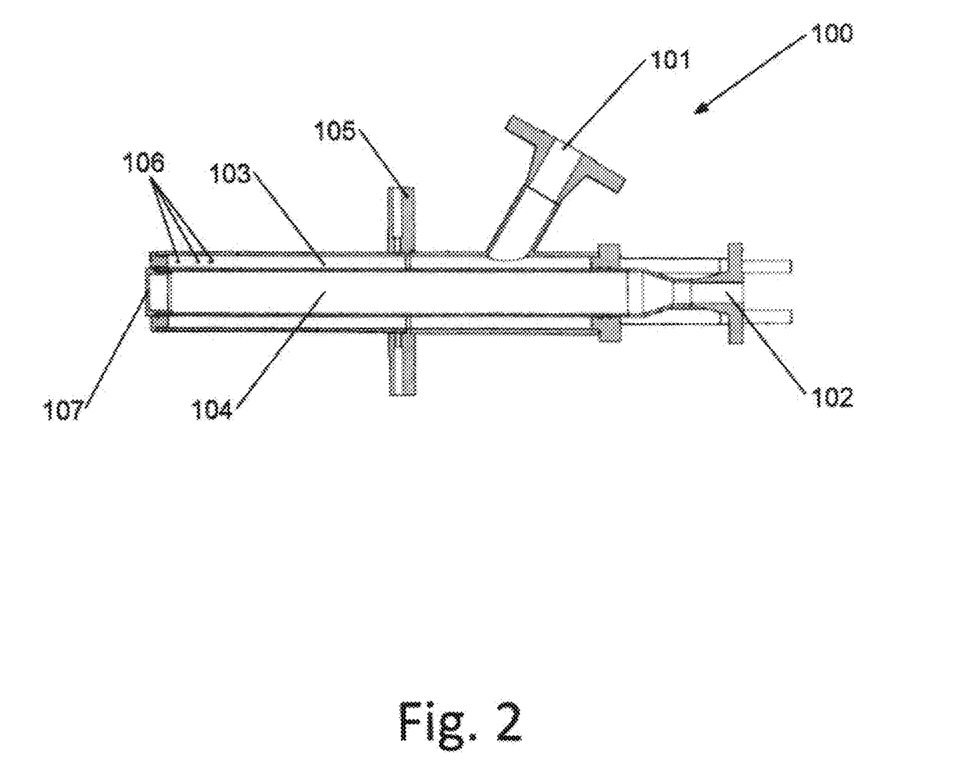
FIG. 2 schematically shows a nozzle assembly in accordance with an embodiment of the present invention.

FIG. 2 schematically shows a nozzle assembly 100 suitable for use with the present invention.

The nozzle assembly 100 comprises a first inlet 101 for receiving fluid from the branch pipe 20 as controlled by the control valve 26 whose flow rate is measured using flow meter 25, and a second inlet 102 to receive fluid passing through the sampling and analysis module 19. The first inlet 101 is in fluid communication with an outer nozzle 103 and the second inlet 102 is in fluid communication with an inner nozzle 104. The nozzle assembly 100 comprises a flange 105 for engagement with the base of the nozzle assembly 13, to which it is attached in use.

The portion of the fluid in the inner nozzle 104 is preferably less than or equal to half of the total extracted by the scoop 12 (and is preferably approximately between 30%-50% of the total extracted by the scoop 12). There is a minimum fluid flow required for the densitometer 19f, and the CCS 30 ensures that this requirement is met based on information from the flow meter 27. This fluid is used to create a relatively strong jet above the centre of the pipe 11.

The jet strength is in reference to the momentum flux ratio:

$$J_{cJ} = \frac{\rho_J \left(\sum_{A_{ci}=1}^{m} U_{cJ_i}\right)^2}{\rho_\infty U_\infty^2} > 1600$$

as it passes through the nozzle holes 107 of the central jet with relatively smaller surface area compared to the outer jets 106. The central jet velocities $U_{cJ_i}$ are area averaged. The stream velocities $U_\infty$ are calculated from the flow rate measured by the flowmeter 29 and adapted to the area of the pipe 11. $A_{ci}$ are the jet hole areas of the central nozzles 107. Since in normal operating conditions the flow in pipe 11 is mostly stratified, the central strong jet operates in a region of the pipeline dominated by lighter components (e.g. oil) and hence the jet is mainly used to maintain the turbulence dissipation rate and to disperse and break up the droplets further.

The portion of the fluid in the outer nozzle 103 is preferably more than half of the total extracted by the scoop 12 (and is preferably approximately 50%-70% of the total extracted by the scoop 12). This fluid forms a doughnut shape, by virtue of the annular arrangement of the outer nozzle 103 about the inner nozzle 104, of thickness ($T_\delta$) between the walls of the inner nozzle 104 and the outer nozzle 103.

The surface of the outer nozzle 103 has multiple nozzle holes 106 of varying diameter ($d_{h\_ON}$) and orientations with angles ($\theta$o) forming a flow surface area relatively larger than those of the central jets 107 and hence forming a weak jet as measured by the square of its velocity ratio or momentum flux as:

$$J_{oJ} = \frac{\rho_J \left(\sum_{A_{oi}=1}^{m} U_{oJ_i}\right)^2}{\rho_\infty U_\infty^2} > 650$$

$A_{oi}$ are the jet holes of the outer nozzles 106. While the jet strength as measured based on the momentum flux is significant in the break up mechanism, the jet width created by the central jets could be smaller than those created by the outer jets where, for example, the outer jet with higher flow rates will be effective to lift the stratified water and deliver it to the central jet for further break up and entrainment atomisation, but with sufficient turbulent dissipation to maintain droplet dispersion.

It is a key aspect of the present mixing system and its nozzle design that the values of ($d_{h\_ON}$), T$\delta$ and $\theta$oi are optimised to provide strong jet penetration, efficient jet break up and hence narrow droplet size distribution and the ability to enhance a "weak jet-strong jet" interaction that creates a horseshoe-vortex structure to suspend the droplets of the heavier components (e.g. water) homogeneously. Representative values are as follows: 1 mm<($d_{h\_ON}$)<150 mm, 8 mm<T$\delta$<30 mm, and 45<$\theta$oi<135.

Figure 3A:
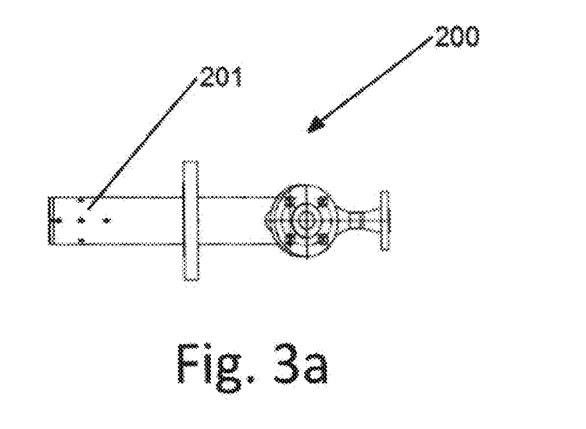
FIGS. 3a and 3b schematically show a second nozzle assembly suitable for use with the present invention.
Figure 3B:
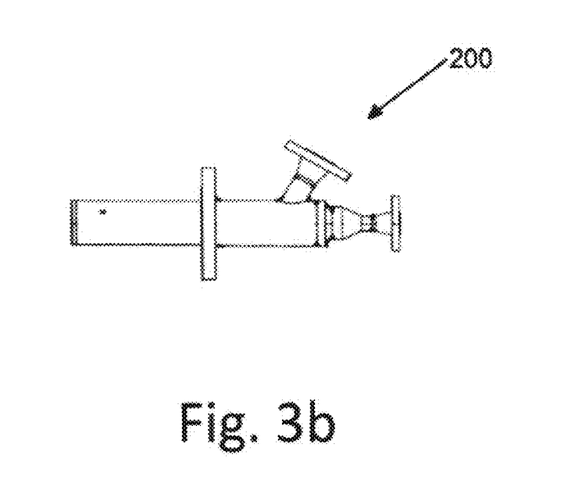

FIGS. 3a and 3b schematically show a second nozzle assembly 200 suitable for use with the present invention. FIG. 3a shows a plan view of the nozzle assembly 200 and FIG. 3b shows a side view of the nozzle assembly 200. The interior of the nozzle assembly 200 corresponds to that shown in FIG. 2.

In the nozzle assembly 200 of FIGS. 3a and 3b the nozzle holes 201 are arranged in a pattern and with ($d_{h\_ON}$), T$\delta$ and θoi values that have been found through experimentation to produce particularly effective mixing. The pattern of the nozzle holes 201 comprises three holes arranged longitudinally along the nozzle assembly 200 and a pair of holes arranges either side of the axis defined by the three longitudinal holes. These nozzle holes are the "front" nozzle holes, in that they inject fluid in the upstream direction of the fluid flow in use. They may be accompanied by "side" holes that inject fluid perpendicularly to the direction of fluid flow, and "back" holes that inject fluid in a downstream direction of fluid flow. The side holes may be arranged vertically downward towards the base of the pipe at an angle of around 46 degrees from the longitudinal axis of the nozzle, and also at 22 degrees from the direction of fluid flow.

The back holes may also be directed vertically downward towards the flange up to an angle of around 46 degrees from the longitudinal axis of the nozzle but parallel to the direction of fluid flow. The back holes have an important safety purpose, in addition to the mixing they generate by breaking up any remnant water that may have not been lifted by the front and side nozzles. The safety aspect relates to the undesirable generation of wake frequency in fluid passing the vertical cylinder of the nozzle. The jet from the back holes destabilises trailing vortices in the fluid flow which are normally responsible for the generation of wake frequency in the fluid flow, thereby creating a safer environment for the operation of the nozzle, and a safer environment for the pipeline and/or plant containing the pipeline, as wake frequencies are known to cause significant damage to equipment and plant shutdowns.

Figure 4:
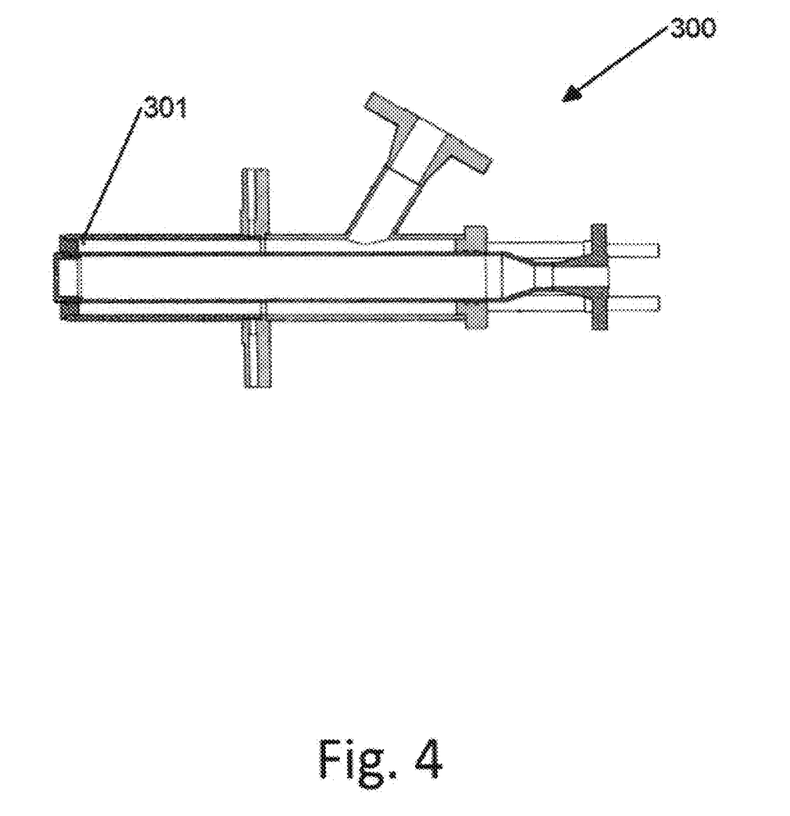
FIG. 4 schematically shows a third nozzle assembly suitable for use with the present invention.

FIG. 4 schematically show a third nozzle assembly 300 suitable for use with the present invention. FIG. 4 shows a side view of the nozzle assembly 300.

In the nozzle assembly 300 of FIG. 4, the holes in the outer nozzle have been replaced with a slit 301. The slit 301 produces a rectangular liquid sheet of extracted fluid in the fluid flow in the pipe 11. The liquid sheet behaviour is distinct from a jet and the fluid undergoes a waving or oscillatory motion of distinct frequency and amplitude when it emerges into the fluid flow, and the forces applied by the fluid flow to the liquid sheet of extracted fluid cause the sheet to break up more readily than a round jet while entraining a larger volume of fluid to form tight droplet size distribution.

In each of the nozzles shown in FIGS. 2-4, the jets produced by the holes/slit in the outer nozzle are weak jets which produce structures (e.g. sheets or droplets) with a relatively short break up time. The hole in the inner nozzle produces a strong jet of extracted fluid, which has a relatively long break up time. The interaction between these two jets (the so-called "Strong Jet-Weak Jet" interaction) results in entrainment atomisation via a horseshoe-vortex structure. Through testing, the horseshoe-vortex structure has been found to be particularly effective at mixing fluid in the pipe 11. A horse shoe vortex occurs when a jet penetrates a flowing fluid—causing stagnation in some areas while also creating faster flows to compensate the portion of that stagnation. This is a requirement/response to keep the continuity of mass conservation. This forms a vertical shape that looks like a horse shoe—fast at its edge and nearly stagnant (low pressure) at its centre—creating a conducive environment for entrainment.

In normal operating conditions the flow in the pipe 11 is usually stratified and unmixed. In these conditions the task of mixing could be viewed as lifting the high density component (e.g. water) layer so that it can be distributed uniformly across the pipe diameter so that representative sampling can be taken.

The outer nozzle may protrude into the pipe 11 up to the centre of the pipe 11, providing the outer nozzle with a height equal to the pipe radius or $\frac{1}{2}D_p$, but other arrangements may have longer or shorter protrusions. The outer nozzle has an outside diameter of $d_{ON\_OD}$ providing a wetted outside surface area $$A_{ON} = \frac{1}{2}\pi D_p d_{ON\_OD}.$$

In a generalised case there is a number of holes $N_{h\text{-}ON}$ each with diameter $d_{h\_ONi}$ (using i as a counter for the number of holes) distributed across the wetted outside surface area $A_{ON}$. The holes are generally positioned facing the upstream flow in the pipe 11. For a simplified and uniform hole sizes, the area ratio takes the form $$A_{R:h\text{-}ON} = \frac{N_{ON}}{2}\left(\frac{d_{h\_ON}}{d_{ON\_OD}}\frac{d_{h\_ON}}{D_p}\right),$$

where the diameter ratios are used as scaling factors.

The number of holes, $N_{ON}$, positions, orientations and sizes, which together with the operating conditions such as the rate of fluid flow in the pipe 11 and the thermo-physical properties of the fluid in the pipe 11, are critical parameters in achieving the required efficient mixing. The range of the area ratio could be $0.001 \leq A_{R:h\text{-}ON} \leq 0.02$.

| | No. of Holes | | Angle (Degrees) | | |
|---|---|---|---|---|---|
| | Min | Max | Min | Max | Orientations |
| Front (180 degrees from direction of fluid flow) | 3 | 15 | 0 | 60 | Upward/upstream/downward |
| Side (90 degrees from direction of fluid flow) | 2 | 8 | 5 | 50 | Downward/upstream |
| Back (0 degrees from direction of fluid flow) | 1 | 4 | 25 | 64 | Downward/downstream |
| Top (0 degree from longitudinal axis of nozzle) | 1 | 9 | 35 | 90 | Upward/vertical |

To handle the worst segregated flow, the flux created by the jets from each hole must engulf a flow regime the size of a sphere with at least 2-3 diameter of the pipe 23—as a measure of its jet penetration. The jet created by the nozzles must have the right width to enhance entrainment of the fluid in the pipe 11 or the mixing spool 23.

The flux from the outer nozzle is dominant below the top end of the nozzle, which may be at the centre of the pipe, and creates a larger jet width and higher flow rate, although it doesn't possess high momentum flux or strength as it flows through a larger surface area. However, it generates sufficient vortex flow and turbulence to lift and mix the stratified flow. The flow from the inner nozzle is dominant above top end of the nozzle, which may be at the centre of the pipe, but has a relatively narrow jet width in comparison to the outer nozzle jets. But, it is a strong jet creating high velocity ratio or momentum flux and allowing it to entrain a large volume of fluid from its surroundings. The Strong jet-Weak jet interaction creates significant velocity gradient that enhances entrainment and mixing, where the dominant mixing is taking place via three key mechanisms—namely:
i) vortex interaction and entrainment;
ii) tearing and stretching of liquid interfaces; and
iii) momentum flux and dispersion.

To understand the mechanisms, it is instructive to describe the dynamic mixing problem in terms of the key parameters that largely govern the device efficiency. For example, the most important application of in-line mixing is when there is a low velocity fluid in the pipeline that leads to predominant stratification, where the problem is further amplified due to density and/or viscosity differences within the fluid in the pipeline. The purpose of mixing is to destabilise such stratification and create local homogeneity across the pipe diameter so that representative sampling can be made from a single point cost-effectively and accurately.

The above-described embodiments are exemplary only, and other possibilities and alternatives within the scope of the invention will be apparent to those skilled in the art. For example, creating a vertical slit nozzle at the front of the outer nozzle could create a better mixing if this system is used in a rectangular channel or pipe size of large diameters (>52"). An arrangement that may be of great interest is when applications require mixing in both micro (small diameter tubes) and macro (large diameter pipes, where disc like slit nozzle configuration of an outer nozzle are complimented by the current types of central nozzles. The disk like nozzles may have the advantage of spreading jets in all directions that can be actuated to change their angles using some means of control—for example, piezoelectrics.

The invention claimed is:

1. A method of mixing a liquid flowing in a pipe comprising:
   securing a nozzle to a wall of the pipe with the nozzle projecting into an interior of the pipe, said nozzle comprising:
       a first, outer, cylinder and second, inner, cylinder concentrically arranged about a nozzle axis;
       a first duct adapted to receive a first portion of a liquid mass and transporting the first portion of the liquid mass to the interior of the inner cylinder;
       a second duct adapted to receive a second portion a second portion of the liquid mass and transporting the second portion of the liquid mass to the interior of the outer cylinder;
       the inner cylinder comprising at least one hole arranged to expel liquid therethrough into the interior of the pipe at a first momentum flux ratio; and
       the outer cylinder comprising at least one hole arranged to expel liquid therethrough into the interior of the pipe at a second momentum flux ratio;
   connecting one of the first and second ducts to a liquid withdrawal scoop downstream of the nozzle;
   withdrawing the first and second portions of the liquid mass using the liquid withdrawal scoop;
   pumping the withdrawn first and second liquid portions to the interior of the inner and outer cylinders respectively; and
   expelling liquid into the interior of the pipe through the holes in the inner and outer cylinders at different momentum flux ratios.

2. The method according to claim 1, wherein the steps of withdrawing a portion of the liquid mass using the liquid withdrawal scoop and pumping the withdrawn liquid to the interior of the inner cylinder further comprise the step of: pumping the withdrawn first portion of the liquid mass through a sampling and analysis module that takes measurements of the properties of the withdrawn first portion of the liquid mass.

3. The method according to claim 2, wherein the step of pumping the withdrawn liquid to the interior of the inner and outer cylinders is carried out by a variable speed pump controlled by a configuration and control system.

4. The method according to claim 2, wherein the step of pumping the withdrawn liquid to the interior of the inner and outer cylinders is carried out by a variable speed pump controlled by a flow computer and controller in combination with a configuration and control system.

5. The method according to claim 3, wherein the configuration and control system controls the speed of the variable speed pump based on measurements taken by the sampling and analysis module.

6. The method according to claim 1, wherein the first momentum flux ration is greater than the second momentum flux ratio.

7. The method according to claim 1, wherein the outer cylinder protrudes into the pipe up to the center of the pipe.

8. A method of mixing a multi-component liquid composition flowing in a pipe, comprising:
   withdrawing a first liquid mass of the multi-component liquid composition;
   transporting the first liquid mass under pressure to an outer cylinder and to an inner cylinder of a nozzle, each cylinder concentrically configured about a nozzle axis;
   expelling a first portion of the first liquid mass through at least one hole configured to expel liquid from the inner cylinder at a first momentum flux ratio;
   expelling a second portion of the first liquid mass through at least one hole configured to expel liquid from the outer cylinder at a second momentum flux ratio, the first momentum flux ratio being greater than the second momentum flux ratio; and
   injecting the first and second portions of the first liquid mass into a flow path of a second liquid mass of the multi-component liquid composition, substantially homogeneously mixing the components of the second liquid mass.

9. The method of claim 8, wherein:
   the step of injecting the first and second portions of the first liquid mass into the flow path of the second liquid mass includes the step of creating a horseshoe vortex and turbulent structure resulting in tearing and stretching the interfaces of the multi-component liquid composition elements in the second liquid mass.

10. The method of claim 9, wherein:
    the step of tearing and stretching the interfaces of the multi-component liquid composition elements creates near mono-disperse droplet sizes, the droplets entrained and remaining suspended in a solution of the multi-component liquid composition elements.

11. The method of claim 8, wherein:
    the first portion of the first liquid mass in the inner cylinder comprises in the range of and including 30 percent to 50 percent of the first liquid mass withdrawn from the multi-component liquid composition.

12. The method of claim 8, wherein:
    the second portion of the first liquid mass in the outer cylinder comprises in the range of and including 50 percent to 70 percent of the first liquid mass withdrawn from the multi-component liquid composition.

13. The method of claim 8, wherein:
the liquid is expelled from the outer cylinder in a doughnut shape.

14. The method of claim 8, wherein:
the liquid expelled from the inner cylinder and the outer cylinder creates a horseshoe-vortex structure that suspends heavy component droplets homogeneously.

15. The method of claim 8, further comprising the step of:
expelling the second portion of the first liquid mass from the outer cylinder, using longitudinally and circumferentially arranged holes in the outer cylinder in at least one of the upstream direction, the downstream direction, and a direction perpendicular to the flow direction of the second portion of the first liquid mass.

16. The method of claim 8, further comprising the step of:

expelling the second portion of the first liquid mass from the outer cylinder, using a slit in the outer cylinder, as a rectangular liquid sheet of fluid flow having motion of distinct frequency and amplitude when inserted into the pipe.

* * * * *